United States Patent [19]

Spotholz et al.

[11] Patent Number: 4,907,719
[45] Date of Patent: Mar. 13, 1990

[54] CONTAINER FOR COLLECTING, PRESERVING, AND SERVING HOT BEVERAGES

[75] Inventors: Clifford H. Spotholz, Montvale, N.J.; Edward L. Scarsella, Bedford Hills, N.Y.

[73] Assignee: General Foods Corporation, White Plains, N.Y.

[21] Appl. No.: 634,915

[22] Filed: Jul. 26, 1984

Related U.S. Application Data

[63] Continuation-in-part of Ser. No. 441,341, Nov. 15, 1982, abandoned.

[51] Int. Cl.$^4$ ............................................. A47J 31/00
[52] U.S. Cl. .......................................... 222/1; 99/320; 220/70; 222/475.1
[58] Field of Search ............................ 220/70, 93, 216; 99/318, 319, 320; 222/386, 386.5, 544, 475.1

[56] References Cited

U.S. PATENT DOCUMENTS

| | | | |
|---|---|---|---|
| 58,200 | 6/1921 | Sailer | 220/70 X |
| 78,104 | 5/1868 | Lehmann | 220/70 |
| 151,246 | 5/1874 | Schreiber | 220/70 X |
| 1,375,158 | 4/1921 | Kramer | 220/70 |
| 1,990,918 | 2/1935 | Ramsden | 220/216 X |
| 3,256,977 | 6/1966 | Petterson | 220/216 X |
| 3,974,758 | 8/1976 | Stone, Jr. | 99/320 X |
| 3,978,941 | 10/1976 | Blessing | 222/386 |

FOREIGN PATENT DOCUMENTS 129924 4/1902 Sweden .................................. 99/320

Primary Examiner—Michael S. Huppert
Attorney, Agent, or Firm—Thomas R. Savoie; Daniel J. Donovan

[57] ABSTRACT

The present invention provides a container for storing, preserving and dispensing flowable comestible products. A floatingly retained, insulation lid tracks the level of the beverage and prevents oxidation, loss of volatiles and contamination of a beverage contained therein. The liquid food product may be disposed by one-handed pouring with the lid retained therein.

5 Claims, 1 Drawing Sheet

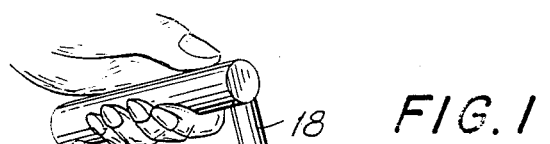
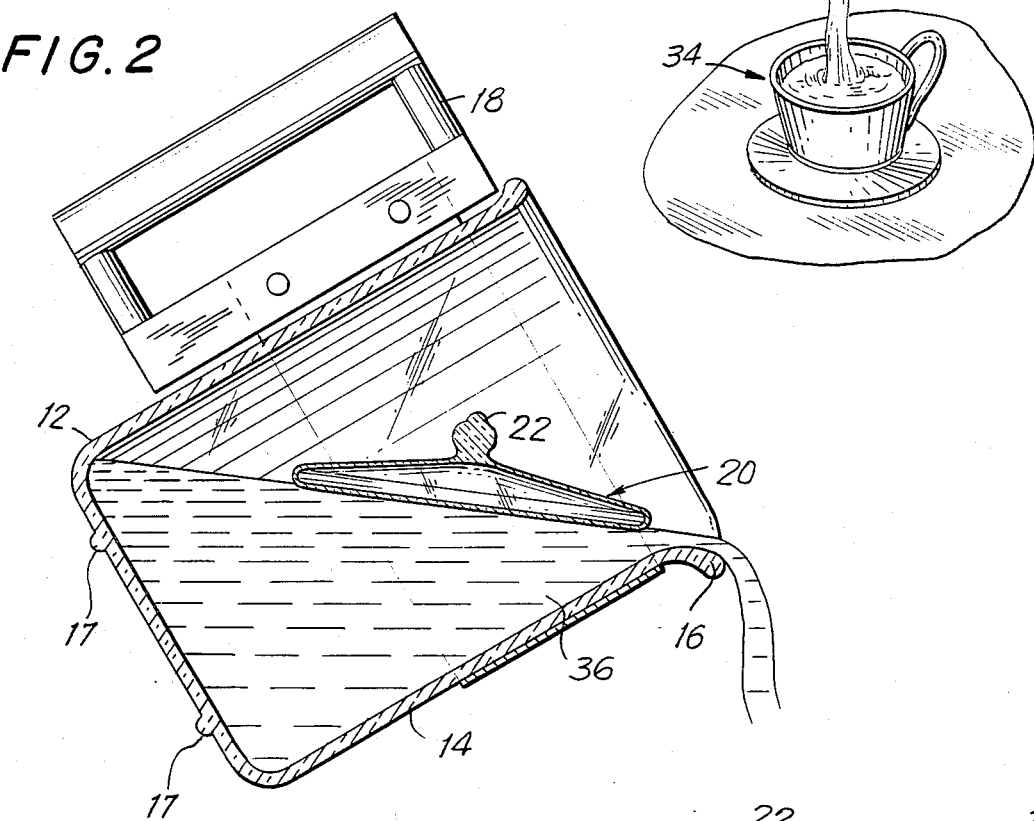
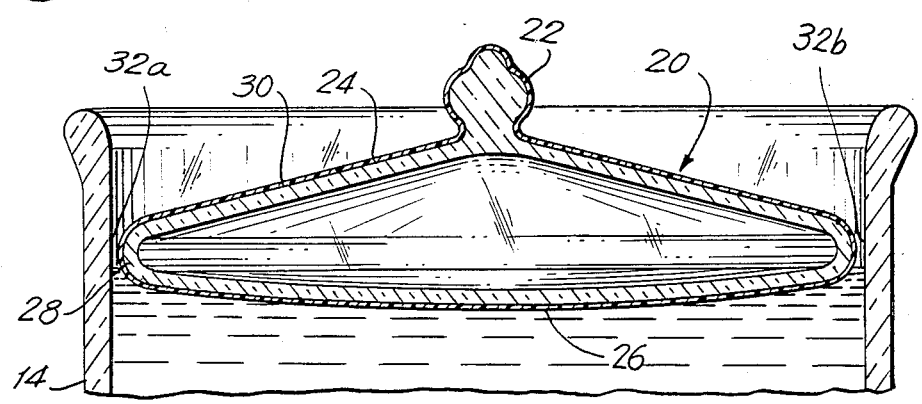

4,907,719

CONTAINER FOR COLLECTING, PRESERVING, AND SERVING HOT BEVERAGES

TECHNICAL FIELD

This application is a continuation-in-part of Ser. No. 441,341 filed Nov. 15, 1982 now abandoned.

The present invention relates to hand-held containers for dispensing hot beverages, and more specifically to a hand-held and floatingly-lidded container for collecting, preserving and dispensing coffee beverages.

The preparation, storing and serving of such beverages as hot chocolate, coffee and tea or of such foods as bouillons and soups, present unique logistical problems which render most available vessels inadequate for the above-stated purposes Such well known containers as the ubiquitous coffee pot, or urns of traditional design can be efficiently employed to heat and serve a pourable comestible. The most significant problems are encountered when the above-mentioned containers are used to maintain such products for prolonged periods of time. For example, coffee which is stored in traditional covered containers, oxidizes upon exposure to and interaction with the surrounding air. This interaction gives rise to off-flavors, rendering the product unacceptable to consumer tastes. Loss of aromatic and desirable volatiles from the exposed surface of the liquid is also a detrimental factor. As the void between the upper level of the comestible and any stationary cover increases, the potential for exposure to outside atmospheric contamination increases as does the potential for the loss of endogenous volatiles.

The problem of oxidation of and loss of volatiles from flowable foodstuffs, which must be kept, in a heated condition, for extended periods of time is well-known in the art. In fact, there are several prior art references which disclose specific embodiments for enclosing a liquid foodstuff beneath a sealing member to prevent oxidation or contamination. U.S. Pat. No. 551,540 discloses such an appliance that has a floating lid which seals liquid within a container. U.S. Pat. No. 1,948,353 shows a similar article, as does U.S. Pat. No. 3,804,635.

U.S. Pat. No. 3,987,941 issued to Blessing, discloses a container for preserving liquids or other liquid food products wherein a cylindrical container is fitted with a follower lid which is supported by the upper level of the liquid and descends downward as the contents of the container are dispensed via a spigot located thereinbelow. This reference discloses a lid which adaptively employs a flexible seal, said seal being attached to the perimeter of the round lid so that an essentially air tight relationship relative to the liquid food product results. The lid is of a diameter which at least equals the inside diameter of the vessel in Blessings design. Moreover, the above-cited design must be incorporated into a non-pourable, static "urn-type" dispensing appliance. Under these design constraints the contents can never be poured from the container, for the lid would tumble out of the container. A spigot located along the bottom well of the tank is the sole egress means for removing the heated beverage from the reservoir. In fact, the lid is weighted so that its center of gravity is as low as possible and is located at the center point of the lid; it is designed so that its travel path is restricted to an upward and downward movement making it impossible to tilt the appliance and the lid to thereby effect pouring.

U.S. Pat. No. 3,974,758 to Stone discloses the use of a sealed or unsealed follower lid in a straight-walled, pour-type coffee maker. This patent further discloses the use of a coventional pour spout of relatively small cross-sectional area wherein coffee from the bottom of the coffee maker is poured from the spout or the use of pour lip at the upper of the coffee maker whereby coffee is removed from the top of the coffee maker.

SUMMARY OF THE INVENTION

Accordingly, the present invention provides a follower lid for preventing oxidation of and loss of volatiles from such hot, liquid comestibles as coffee, tea, soup or the like and which lid can be used in combination with hand-held, straight-walled vessels from which the liquids are dispersed by pouring. The follower lid is disposed within an essentially cylindrical vessel with the lid being of a diameter which is less than the inside diameter of the vessel, and being designed to float above the hot liquid. The floatingly retained lid is not confined to a simple upward and downward travelpath, but is able to conform to the angle and to the level of the surface of the liquid, allowing for said beverage to be poured from the vessel, while at the same time retaining the lid within said vessel.

In order to permit proper functioning of the lid it is necessary for the internal surface of the bottom of the cylindrical, straight-walled vessel to be planar. Depressed central portions or other depressed or raised elements on this surface will cause the lid to hang up on this surface as the last portions of the coffee are poured from the vessel. This hanging up of the lid could present a dangerous situation to the consumer since the lid could tumble from the vessel.

The follower lid may possess an internal insulation barrier, which aids in maintaining the liquid comestible in a heated condition. The insulation within the follower lid acts as a thermal barrier and may be comprised of insulating materials, an air space or a vacuum or a gas. The vessel may be disposed under any of the several conventional drip coffee maker units without mechanical alterations of the unit. However, heat requirements from a bottom heating plate or other heat source, used to maintain the liquid at a constant elevated temperature is significantly reduced. This results from reduced heat loss from the liquid surface due to the presence of the floating lid. If the heating unit is equipped with a variable temperature control, a low setting may be used to keep the coffee at serving temperatures (typically 180° F.). If the heating unit operates only at a preset temperature which is sufficient to maintain the coffee at serving temperatures in the vessel without a follower lid, it will be necessary to reduce contact between the bottom surface of the vessel and the heating surface. Any means (e.g., a wire loop or ring or discrete elements or feet which are integral with and protrude from the bottom surface of the vessel) which will permit an air space to exist between the bottom of the vessel and the heat source, may be used.

Not only does the present invention possess the above enumerated advantage of providing an excellent thermal barrier, but also the floatable lid which essentially covers the liquid food or drink product disposed thereinbelow preserves and protects the commestible product from exogenous sources of contamination, and greatly reduces loss of desirable aromatic constituents contained within the liquid. The present vessel and follower lid combination maintains a liquid comestible (e.g. coffee) in an uncontaminated state for use or sale and prevents the oxidation of said comestibles, which is normally promoted by a combination of high temperatures and constant exposure to air. The lid which floats on the surface of the liquid comestible and covers almost totally said liquid provides an environment that will be resistive to evaporation or contamination. The unique structural design of a floatingly retained follower lid allows for pourability and preservation of the liquid product. As will be recognized however, the follower lid of this invention can be utilized effectively in straight-walled urns from which liquid is dispensed from a spigot located at the bottom portion of the urn.

A further and totally unexpected advantage which has been established for this invention is that coffee brew flavor is enhanced over time. Thus, not only is coffee which has been brewed and maintained for several hours under the protective, floating lid of this invention greatly preferred to similarly brewed coffee which has been maintained for a like period of time in an identical pot without a floating lid but the coffee which has been stored for several hours under the lid is preferred to freshly brewed coffee. It is hypothesized that this enhancement or improvement in coffee flavor is due to favorable interactions among the retained volatiles, which volatiles, if not for the presence of the floating lid, would either escape from or be constantly refluxing above the surface of the brewed coffee, and/or to reactions by non-oxidized components of the brew.

It has been further found that, with respect to brewed coffee, when milk or cream is added to a coffee brew which has been maintained for several hours under the floating lid of this invention a desirable golden brown color results comparable to the color obtained when milk or cream is added to freshly brewed coffee. The addition of milk or cream to coffee brew which has been exposed to the atmosphere for several hours results in the brew developing an undesirable grey cast.

BRIEF DESCRIPTION OF THE DRAWINGS

FIG. 1 illustrates a perspective view of a hand held container in combination with the follower lid of this invention, for preserving and serving hot beverages;

FIG. 2 is a sectional view taken along lines 2—2 of FIG. 1 showing the operative kinetics as the lid rests within the upper surfaces of the liquid comestible; and FIG. 3 is a sectional view of another embodiment of the floating follower lid in combination with a filled container.

DETAILED DESCRIPTION OF THE PREFERRED EMBODIMENT

Referring more specifically to the drawings, wherein like numerals refer to like parts throughout, FIG. 1 shows a person pouring a liquid comestible from the container and lid combination which embraces the present invention, said container and lid combination shall be generally referred to by the numeral 10. FIG. 1 provides a view of the beverage container in a filled condition, and shows the overall relation between beverage container and lid 10 and a receptacle 34 located thereinbelow and situated to receive said liquid contents. The most prominent feature of this preferred embodiment of the present invention as illustrated is the fact that the beverage may be one-handedly poured without affecting the functioning of the floatingly retained follower lid 20.

FIG. 1 best illustrates the present invention's ability to pour hot liquids as for example, coffee, while keeping said beverage in a non-oxidized state and free from contamination. The lid, as one can see, floats on the top of liquid comestible 36 and within normal pouring angle limits will be retained within the uppermost boundaries of said liquid so that said liquid comestible may be poured from vessel 12 via spout 16 into awaiting receptacle 34.

Lidded container 10 is designed for "easy-filling", said container being acceptably adapted to be placed beneath any one of several electric drip-type coffee makers. Lid 20 may be placed within empty vessel 12 before the electric drip maker is activated, thereby allowing said coffee to stream over the upper lid surface. Preferably this surface is outwardly convex in shape as shown in FIGS. 2 and 3. This upper arcing surface 24 of lid 20 acts as a channel to guide the dripping coffee over said upper surface and under said lid. As vessel 12 becomes filled, the lid 20 will float on top of finished beverage product 36, the lid rising with the level of said beverage. An alternate method would be to allow the vessel 12 to fill and then grasping knob 22 manually place the lid 20 over and on top of the contents retained therein. As one can see, by FIG. 1, the ability to pour the heated beverage from the lidded container 10 into a cup necessitates a bouyant lid that will adjust to the level and angle of the food product contained within.

It is also within the scope of this invention to fashion a drip-type coffee maker wherein the coffee basket is placed directly on top of the floating lid which lid would be placed at the bottom of the coffee pot before the start of the coffee-making cycle. Accordingly to this embodiment the lid and basket would move up in the pot as the pot fills with coffee. When operating in this manner exposure of brewed coffee to the air is further reduced, since the distance the brewed coffee must traverse between the bottom of the basket and the protection afforded beneath the floating lid is at a minimum. Typically the basket will be in direct contact with the lid at only the central portion of the upper lid surface, in order that flow of liquid through the coffee basket is not hindered.

FIG. 2 clearly illustrates the relationship displayed by floatingly retained follower lid 20 as it tracks the angle of the liquid comestible held within the lidded container 10. As a preferred embodiment, the lid 20 is essentially hollow, advantageously employing a boyancy line and a point of gravity that will, at all times, exert sufficient force downward to retain the lid within the upper surface of the beverage. In this configuration the forces which are explained or more fully elucidated hereinbelow, which interact against lid 20 in essence hold lid 20 within the surface of the liquid or comestible 36.

FIGS. 1 and 2 clearly elucidate a most unique feature of the present invention. When vessel 12 is utilized for pouring a liquid a unique phenomeon may be observed concomitant with said use. When a person grasps lidded container 10 by handle means 18 and pours liquid comestible 36 therefrom and into receptacle 34 said receptacle being like the illustrated coffee cup, follower lid 20, remains relatively stationary within said vessel. Hence, when vessel 12 is placed in a vertical orientation relative to the resting surface, said surface being like a heating unit of an electric coffee maker, lid 20 will track said beverage to effectively seal said beverage from outside contaminants and protect said beverage thereby from heat loss. Floating lid 20 is held within the surface of the retained beverage for a variety of reasons, which are direclty related to the design of said lid. The lid is designed so that its bottom surface is essentially flat as shown in FIG. 2 or slightly convex in shape as shown is FIG. 3. A biconvex-shaped lid will float at a higher level and facilitate grasping an upstanding knob or handle without the consumers fingers coming into contact with hot liquid.

The floatingly retained lid is designed so that there is an equal material distribution of weight within said hollowed lid; the result being that the center of gravity and bouyancy lie on the same vertical line. Therefore, the force exerted by the top is such that it can be directed radially outward and downward relative to said product. Hence, when a person grips handle 18 of lidded container 10 to pour contents from said vessel, floating follower lid 20 will be held within and on the surface of said pourable comestible 36. Moreover, the inherent design of said lid which allows for a shallow draught, permits floating follower lid 20 to reside within the upper boundary layer of a liquid comestible 36.

Knob 22 provides a means for the extraction of lid 20 from vessel 12. Said knob assembly is preferably integral with upper convex surface 24 but as an alternate embodiment may be fastened thereto.

FIG. 3 shows most clearly the manner in which one embodiment of lid 20 is disposed within vessel 12. Lid 20, as one can see, is of essentially hollow construction and possesses a void within upper arcing surface wall 24 and lower outwardly arcing wall 26. The resulting biconvex shape has a hollow void which may be filled with a variety of insulation materials including air or other inert insulating gases or perhaps even a vacuum. Said void creates a superior heat-holding insulating area that will provide a barrier for keeping stored heat within the vessel, thereby reducing energy needs for maintaining desired temperatures.

As shown in FIG. 2 the internal surface of the bottom of the vessel is planar so as to eliminate the possibility of the edge of the float hanging up on any non-planar elements located on the bottom surface as the float edge passes across this bottom surface while the last portions of liquid are poured from the vessel.

The lidded vessel shown in FIG. 2 would be most suitable for use in combination with a heating platen which is equipped with temperature control means. In this manner boiling of the coffee can be avoided by regulating the temperature. Should it be desired to use the vessel of FIG. 2 in combination with conventional, existing electric drip coffee makers, which do not have temperature control and are set to maintain coffee having an exposed surface at serving temperature, it would be necessary to reduce the heat input to coffee which is protected and insulated by a floating lid. Such heat reduction could be conveniently effected by spacer means (e.g., wire loop or screen) inserted between the vessel and the platen so that at least a portion of the heat which is emitted from the heat source is dissipated to the surrounding air without passing into the coffee liquid.

If the use of a separate insert element is desired to be avoided, the same function may be served by providing the exterior bottom of vessel with two or more protrusions such as multiple raised straight ribs, curved ribs or hemispherical members, such as shown in FIG. 2 at reference numeral 17. These protrusions must, of course, be uniformly spaced or oriented across the bottom of the vessel so that the vessel will be stable and not tilt while resting on a flat surface. Preferably the vessel will be fabricated of glass or a clear plastic material and the desired protrusions will be molded with the bottom of the vessel.

When the lid 20 is made of glass or glass like material, a hydrophobic food-approved polymeric material is desirable as a coating over the lid. The coating should, at a minimum, extend around the peripheral surface of the lid and can extend to envelope the entire lid, such as shown at reference numeral 30 in FIG. 3. The polymer must be heat resistant and not degrade under repeated exposure to acidic comestibles or high temperatures. Moreover, the polymer should be of a type that does not readily bind aromas or absorb odors. For example, the following polymers are suitable, polypropylene, polyvinyl chloride, polyethylene terephalate, polycarbonate and nylon to name a few of what is an endless list of materials. Hydrophobic polymers are especially suited for the above-stated task since they do not degrade upon exposure to high temperature and/or acid or alkaline environments. Alternatively, it would be possible to fabricate the entire lid from polymeric materials. The vessel may be fabricated from glass, ceramic or metal material, but in the hand-held vessel form is preferably of glass.

Floating follower lid 20 is of a diameter that is from 90% to less than 100% of the internal diameter of the vessel depicted as the distance between the inner wall surfaces 32a and 32b shown in FIG. 3. Preferably, the lid is at least 95%, most preferably at least 99% of the internal diameter of the vessel.

As an alternate embodiment of the present invention, as shown in FIG. 2, the lid according may be designed with an essentially flat bottom surface. A flat bottom construction for the lid might enable a less complex manufacturing method to be utilized.

Having thus described the invention, what is claimed is.

1. In a method for collecting and preserving coffee using an electric, drip-type coffee maker wherein heated water is passed through an extraction basket which contains roasted coffee and the liquid coffee which passes from the extraction basket is collected in a vessel which rests on a flat heating platen the improvement comprising:
   (a) said vessel having a cylindrical shape, a pour spout located on its top rim and a vertically-oriented handled member located diametrically opposite said spout;
   (b) placing a bouyant lid in the vessel before any liquid coffee is collected in the vessel such that the lid floats on and covers on the rising surface of liquid coffee which is collected in the vessel, said lid having a diameter which is from 95% to less than 100% of the internal diameter of the vessel, said lid being made of glass, a hydrophobic, food-approved polymeric material or a combination thereof, said lid having an intergrally disposed knob or lifting means for extracting the lid from the vessel and said lid being effective to prevent oxidation of and loss of volatiles from the liquid coffee;
   (c) providing spacer means between the heating platen and the vessel such that a portion of the heat emitted from the platen is dissipated to the surrounding air.

2. The method of claim 1 wherein the spacer means consists of two or more protrusions located on the exterior bottom of the vessel.

3. The method of claim 2 wherein the protrusions are molded with the bottom of the vessel.

4. The method of claim 1 wherein the floating lid is made of polymeric material.

5. The method of claim 1 wherein the floating lid is made of glass and is coated at least in part by a layer of polymeric material.

* * * * *